Jan. 19, 1965

L. STERN 3,165,993

AUXILIARY BACK FOR ADAPTING STUDIO CAMERAS FOR USE OF SMALL FILM

Filed Dec. 13, 1961

INVENTOR.
Leo Stern
BY
Paul E. Mullendore
ATTORNEY

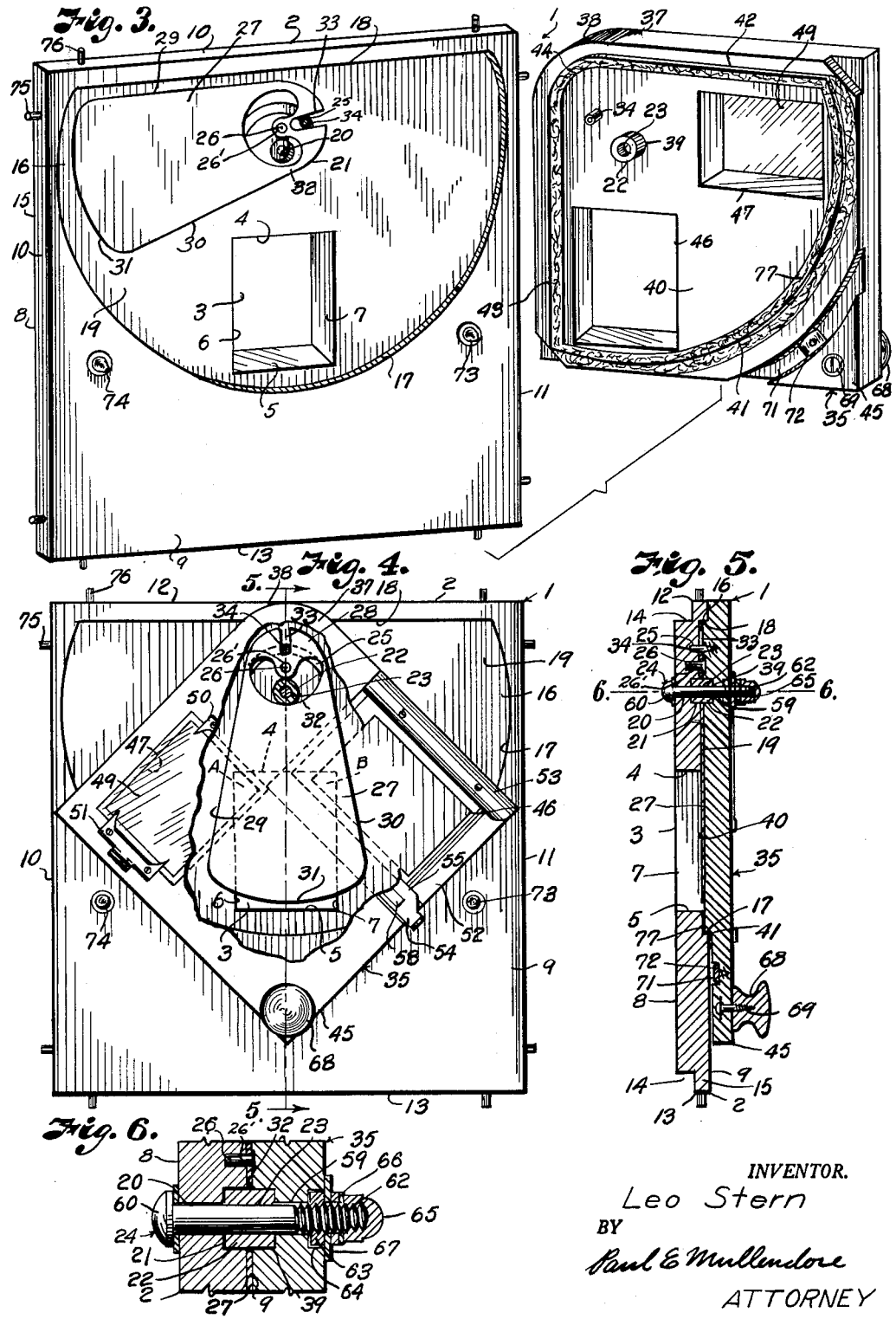

United States Patent Office 3,165,993
Patented Jan. 19, 1965

3,165,993
AUXILIARY BACK FOR ADAPTING STUDIO
CAMERAS FOR USE OF SMALL FILM
Leo Stern, 1122 Grand Ave., Kansas City 6, Mo.
Filed Dec. 13, 1961, Ser. No. 159,134
7 Claims. (Cl. 95—48)

This invention relates to an auxiliary back for studio and other professional cameras, to adapt such cameras for use of film in rolls, sheets or packs, wherefrom photographs in black and white or color may be produced at low cost and of a professional quality.

For example, studio cameras for portrait work are equipped for using large sensitized plates, usually 8" x 10", consequently studio cameras as usually constructed are not adapted to make inexpensive small photographs or low cost color portraits. This is because small films in black and white or color are available only in rolls or packs that cannot be readily used in studio cameras to obtain the studied poses required in high quality portrait work.

It is, therefore, the principal object of the present invention to provide an auxiliary back for such cameras, to be substituted for the usual viewing back, and which has a carrier provided with a viewing panel and a film holder which may be alternately brought into and out of registry with a picture opening in the auxiliary back merely by swinging the carrier about a pivot from one stopped position to the other. In this way there is nothing to watch and the carrier may be operated in the dark under studio conditions.

Prior to the present invention attempts have been made to provide a pivoted carrier, but the supporting back therefor was larger than the back of the camera, and therefore unwieldy, or the picture taking position was not in the center of the camera. Also, when shifting the carrier there was a danger of fogging the film when shifting from one position to the other by light rays passing through the viewing panel.

Therefore, other objects of the invention are to provide an auxiliary back for cameras that is no larger than the original viewing back and in which the picture opening is in the axial center of the camera, so that the auxiliary back may be readily handled when changing from a horizontal format to a vertical format; to provide a light shield that shifts automatically with shifting of the carrier to prevent fogging of the film; to provide an auxiliary back for carrying film holders which has ample light traps between the supporting back and the carrier; and to provide an auxiliary back for cameras that is readily fitted to the viewing back attachments with which the camera is equipped, thereby making it easy to transfer from the usual back to the auxiliary back of the present invention.

In accomplishing these and other objects of the invention I have provided improved structure, the preferred form of which is illustrated in the accompanying drawings, wherein:

FIG. 1 is a perspective view of an auxiliary back for studio and similar cameras to adapt such cameras for use of small film contained in rolls or packs, and which includes a carrier for a viewing plate and a film holder, the carrier being in the stopped position where the viewing panel is registering with the picture opening, and the roll film holder being removed from the carrier to better illustrate the mounting fixtures therefor.

FIG. 2 is a similar view, but showing the viewing panel moved out of viewing position and the film holder in position over the picture opening, the holder being illustrated in dotted lines.

FIG. 3 is a perspective view of the parts of the auxiliary back with the parts in disassembled relation with the carrier member being positioned to show the face side thereof, which, when assembled on the support member, faces over the light shield; to better illustrate the construction and particularly the light shield which prevents fogging of the film when the carrier is being shifted to and from its respective positions.

FIG. 4 is a plan view of the auxiliary back showing the carrier for the film holder midway between its two positions and broken away to show the light shield.

FIG. 5 is a vertical section through the auxiliary back on the line 5—5 of FIG. 4.

FIG. 6 is an enlarged fragmentary section through the holder on the line 6—6 of FIG. 5.

Figure 1:
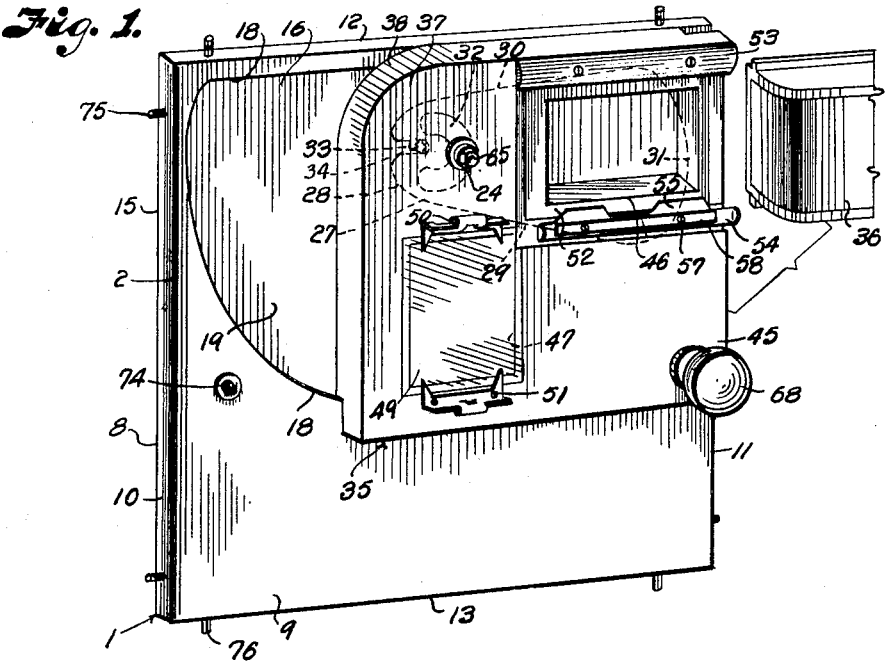

Referring more in detail to the drawings:

1 designates an auxiliary back constructed in accordance with the present invention and adapted to replace the viewing back on a studio camera in order that small film in rolls, packs, or sheets can be used. The auxiliary back includes a substantially square support member 2 having a size and thickness substantially conforming to the viewing back (not shown) of an ordinary studio camera, also not shown. The support member 2 has a central picture opening 3 that is of rectangular shape and has opposed side faces 4–5 and 6–7, spaced apart a greater distance than the size of the film to be used. For example, a popular and inexpensive small roll film is 2¼" wide and supplied in rolls of lengths sufficient to provide either eight negatives of approximately 2¼"x 3" size or twelve negatives of 2¼" x 2¼" size, in which case the dimensions of the opening 3 will be approximately 2½" x 3¼". While I have described a particular film size, it is simply by way of explanation and not to limit the invention to a particular size of small film.

The support member 2 may be formed of any suitable material, such as plywood, Masonite, or the like, that is rigid and not affected by moisture. The front and rear faces 8 and 9 of the support member are generally flat, but the four side edges 10, 11, 12 and 13 are rabbeted as indicated at 14 in FIG. 5 to provide flanges 15 that seat against the back of the camera (not shown).

Formed in the surface of the rear face 9 is a shallow recess 16 of somewhat more than semicircular in shape to provide an inner arcuate shoulder 17 extending under and upwardly of the picture opening 3 and a straight shoulder 18 extending along the side edge 10 to provide a continuous shoulder entirely surrounding the opening 3. The bottom of the recess provides a partially circular site 19 to cooperate with the shoulders 17 and 18 in forming a light trap about the opening 3, as later described.

Formed in the support member in the center of the site 19 and located above the side face 4 of the opening 3 is an opening 20 provided with a counter bore 21 extending inwardly from the site 19 to accommodate therein a cylindrical pivot member 22 having a length to project outwardly from the site 19 of the recess. The pivot member 22 has an axial opening 23 registering with the opening 20 to pass a fastening device 24, as later described. The site 19 also has an arcuate groove 25 curving about the axis of the pivot member 22 as the center and spaced radially therefrom. Located between the pivot member 22 and the groove is a pivot pin 26 on which a light shield 27 is pivotally mounted, as best shown in FIGS. 3 and 4.

The light shield 27 is preferably wafer thin and has a generally sector shape, with a rounding head portion 28 and diverging side edges 29 and 30 spaced apart so that the shield is slightly wider than the width of the opening 3. The head portion 28 has a bearing opening 26' in the center thereof to mount the light shield 27 on the pin 26 for oscillatory movement. The end of the shield opposite the head portion 28 and which swings across the picture opening 3 is also rounding as indicated at 31, to clear the arcuate shoulder 17 of the recess 16 when the shield is oscillated across the opening 3, as later described. The head portion 28 of the light shield 27 also has an arcuate opening concentric with the bearing opening 26' so that the pivot member 22 for the support member extends therethrough and does not interfere with swinging movement of the shield 27. The head portion 28 of the light shield 27 also has a radial slot 33 extending from the outer edge thereof in crossing relation with the arcuate groove 25 to accommodate a pin 34 that projects into the groove from a carrier 35 for the roll film holder designated 36 in FIG. 1.

The carrier 35 includes a generally rectangular block which may be formed of any suitable material, having one corner 37 rounded as indicated at 38 on a radius from a socket 39 within the inner face 40 thereof to receive therein an end of the pivot member 22 and on which the carrier is oscillated upon the support member 2.

The marginal edges of the carrier 35 are rabbeted on the inner face side 40 thereof to provide an arcuate shoulder 41 fitting the curvature of the arcuate shoulder 17 of the support member, side shoulders 42 and 43 and an arcuate shoulder 44 following the contour of the rounding corner 38.

When the carrier 35 is mounted on the pivot member 22, the shoulders 41, 42 and 43 are contained within the recess 16 so that the face side 40 of the carrier member makes contact with the light shield 27. Formed in the carrier 35 on the respective opposite sides of a plane extending through the pivot 22, pin 34, and the opposite corner 45 of the carrier are rectangular openings 46 and 47 substantially conforming in size to the picture opening 3 and which are arranged at substantially 90° with respect to each other and located equal distances from the axis of the pivot member 22, so as to alternately register with the picture opening 3. When the opening 46 is in registry with the picture opening 3, the shoulder 42 is contacting the shoulder 18 of the support member 2, and when the opening 47 is in registry with the opening 3, the shoulder 43 makes contact with the shoulder 18.

In order to actuate the light shield automatically with pivotal movement of the carrier, the pin 34 on the carrier projects through the slot 33 of the shield 27 and into the arcuate groove 25, as best shown in FIG. 5. It will thus be noted that when the film carrier 35 is mounted on the pivot member 22 it swings about one axis and the light shield 27 when mounted on the pivot 26 swings about another axis through a greater arc in the same length of time because of the pin 34 and radial slot 33 connection with the light shield.

The opening 47 on the outer side of the carrier is rabbeted around the edges thereof to seat a viewing panel 49 that is retained by fasteners 50 and 51, which also, if desired, may provide latch means for retaining a shield or hood (not shown).

The margins surrounding the opening 46 are similarly rabbeted but at slightly greater depth, to provide a recess 52 on the outer side edge of the carrier to accommodate the film holder 36, shown in FIG. 1. The carrier is provided with suitable fastening means such as a fixed cleat member 53 at one side and a cam plate 54 at the other. The cleat member 53 overlaps a side flange on one side of the holder 36 while the plate 54 has lateral extensions 55 which move over the retaining flange at the other side of the holder when the plate 54 is moved longitudinally to impart a camming action by reason of angular slots 56 through which fastening devices 57 are extended to retain a pressure spring 58 that acts against the plate 54 to hold it in its adjusted positions.

In order to retain the carrier member on the pivot member 22, a fastening device 24 previously referred to is passed through the opening 20 of the support member 2, opening 23, pivot member 22, and an opening 59 in the carrier 35. The fastening device may comprise a bolt having a head 60 engaging the front face 8 of the support member and having a threaded shank 62 projecting from the outer face of the carrier for mounting a nut 63 (FIG. 6) that is accommodated in a counter bore 64 of the opening 59 and which is retained from rotation by a lock nut 65 and a lock washer 66 bearing against a washer 67 that bears upon the nut.

To facilitate swinging of the carrier from one to the other of its positions, the corner 45 has a knob 68 which is secured thereto by a fastening device 69.

In order to latch the carrier in one and the other of its positions, the inner face of the corner 45 of the carrier is provided with an arcuate groove 71 in which is secured a socket member 72 adapted to engage with one or the other of spring pressed latches 73 or 74 that are inset on the outer face of the support member at opposite sides of the support member 2, as shown in FIGS. 3 and 4.

In order to fit the auxiliary back 1 to the camera, the edges thereof have pairs of projecting pins 75-76 that are adapted to engage the fixtures on the camera (not shown) that ordinarily retain the viewing back, in a manner well known to photographers and others familiar with cameras, the specific construction of which forms no part of the present invention.

To enhance the light seal between the carrier and the support member, the edge of the carrier has a felt strip 77 extending along the marginal edge thereof to make contact with the bottom of the recess 16.

In assembling the parts constructed as described, the shield 27 is secured to the support member 2 by means of the pivot pin 26. The carrier member 35 for the film holder 36 is applied to the support member 2 over the shield 27 in such a manner that the pin 34 enters the slot 33 and passes into the groove 25 while the pivot member 22 passes into the counter bore 21. When in this position, the shoulders 42, 43 and 44 of the carrier member are contained within the recess 16 of the support member. The fastening device 24 is then inserted through the registering openings 20, 23 and 59, after which the nut 63, washer 67, and lock washer 66 are applied, followed by the lock nut 65. The carrier member 35 is now oscillatable about the pivot member 22 from a latched position, shown in FIG. 1, to the latched position shown in FIG. 2.

In applying the assembly to a studio camera, the customary viewing panel of the camera is removed and the support member 2 is applied to the back of the camera and marked for the pairs of pins 75 and 76. The assembly is then removed and suitable holes are drilled into which the pins 75-76 are driven. In order that both horizontal and vertical formats can be obtained, all four sides of the support member are provided with the pins 75 and 76. In this way, the assembly can be turned relatively to the camera so that the picture opening 3 is in either vertical or horizontal position. The roll film holder 36 is slid into the recess 52 so that one flange thereof enters under the cleat 53 and the opposite flange is in position to be engaged by the lateral extensions 55 when the plate 54 is reciprocated in one direction to cause the slots 56 to cam the lateral extensions 55 over the opposite flange of the film holder 36.

If a picture is to be made having a vertical format, the auxiliary back is positioned on the camera with the picture opening 3 in vertical position. The film holder carrier 35 is then shifted on the pivot member 22 to the latched position shown in FIG. 1, where the viewing panel 49 registers with the picture opening 3 and the film holder 36 is out of registry. During this movement of the carrier 35, the pin 34 has shifted the light shield 27 to the position shown in dotted lines in FIG. 1 and out of the way of the picture opening.

If desired, a hood (not shown) may be applied over the viewing panel 49.

Assuming that the film carrier 35 is in the position shown in FIG. 1, the viewing panel 49 is in registry with the picture opening 3, and the front of the roll film holder 36 is covered by the light shield 27, as shown in dotted lines. In this position of the light shield 27, the longitudinal median line thereof, which extends through the pivotal axis of the pivot member 22 and through the pin 34, is at substantially right angles to the longitudinal median line of the picture opening 3. To move the viewing panel 49 out of registry with the picture opening 3, the film carrier 35 is moved clockwise on its pivot member 22 (FIG. 1) toward the position shown in FIG. 2. With the start of the movement (FIG. 1), the pin 34 on the film carrier 35, riding in the slot 33, applies leverage on the light shield 27, and starts turning of the light shield 27 at a faster speed, also in a clockwise direction, about its pivot pin 26. It will be noted in FIG. 4, which is a halfway position, that as the film carrier 35 continues to move, there is a place in the movement where a corner of the opening 47, designated "A," and a corner of the opening 46, designated "B," are over the picture opening 3. If the light shield was omitted, light rays would pass through "A" to the interior of the camera and be reflected back through "B," fogging the film in the film holder 36. The light shield prevents this from happening, since the speed of the light shield 27 increases over that of the film carrier 35 and covers the picture opening 3, as shown in FIG. 4.

Figure 2:
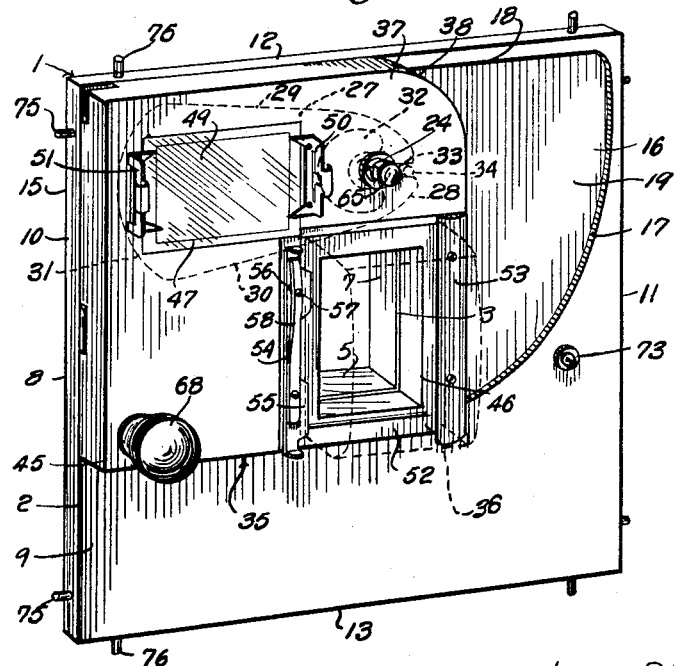

The differential movement between the film carrier and the light shield is clearly noted by comparing the position of the parts in FIG. 4 with the starting position in FIG. 1. It will be seen that the film carrier has moved only about 45° from its starting position, whereas the light shield has moved about 90°. This is brought about by the connection of the pin 34 with the slot 33 and the different pivotal axes of the light shield 27 and the film carrier 35 (see the relative position of the pivot member 22 and the pivot pin 26, FIG. 5). It will be noted that the actuating leverage applied by the pin 34 has a length equal to the distance between the pin 34 and the axis of the pivot 22, whereas the connection of the pin 34 with the light shield acts on a shorter lever having a length between the pivot pin 26 and the pin 34. The pin 34, being attached to the film carrier, moves only 45° about the axis of the pivot member 22, but the light shield in the meantime has been moved 90° on its pivot pin 26. As the film carrier 35 continues movement from the position shown in FIG. 4, the light shield will clear the picture opening and is fully positioned under the viewing panel 49 (see dotted lines, FIG. 2) when the film holder 36 has fully registered with the picture opening 3 as shown in FIG. 2. After the film has been exposed, the carrier is returned to the position shown in FIG. 1, when another picture is to be taken. The film carrier 35 will be moved counterclockwise from the position shown in FIG. 2, to bring the viewing panel 49 into registration with the picture opening 3 and the film holder 36 back to the position shown in FIG. 1. During this movement, the light shield has the same differential movement in the reverse direction, and prevents fogging of the film on the return movement. The carrier member is latched in its respective positions shown in FIGS. 1 and 2 by the engagement of one or the other of the resilient latches 73 and 74 with the socket member 72.

Assuming that a picture is to be taken on a horizontal format, the carrier member is turned so that the picture opening 3 is in horizontal position, after which the carrier member is manipulated in the same manner as previously described.

From the foregoing it is obvious that I have provided an auxiliary back for a film holder which conforms to the back of a studio or professional camera and which includes adequate light traps, including the shield member 27, to prevent fogging of the film while the film holder carrier is being moved from one of its positions to the other.

By the use of the auxiliary back as described, a standard film holder may be used for containing the popular small size color or black and white film, to adapt a studio camera to the taking of small color pictures to be used as portraits, proofs, or other purposes, or in establishing the colors to be used when making larger studio portraits for hand coloring. Also, with the small film the photographer may have the films processed in accordance with the usual color processing procedure.

What I claim and desire to secure by Letters Patent is:

1. An auxiliary back for studio and like cameras to adapt such cameras to small film contained in a film holder, said auxiliary back including a support member for attachment to the back of the camera and having a picture opening substantially centrally thereof, and a carrier member having pivotal connection with the support member at a point spaced from one side of the picture opening, said carrier member having a viewing opening and an opening seating the film holder thereover with said openings being each arranged symmetrically of a plane passing radially through the pivotal connection and located substantially 90° apart and all of said openings being equally spaced from the pivotal connection whereby said viewing opening and the opening seating the film holder are alternately registrable with the picture opening upon oscillation of the carrier member about said pivotal connection.

2. An auxiliary back for studio and like cameras as described in claim 1, and including latch means on the support member and engageable with a part of the carrier member to hold the carrier member in its respective positions.

3. An auxiliary back interchangeable with the viewing back of a studio and like camera to adapt such camera to small film to be contained in a holder, said auxiliary back including a support member corresponding in size to the viewing back and having a picture opening in the center thereof, said support member having a partially circular site encompassing said picture opening with the center of radius thereof spaced from a side of the said opening, a pivot member carried by the support member in the center of radius, a rectangular carrier member of smaller size than the support member and having one corner secured to said pivot member and having a pair of openings arranged radially from said pivot member substantially 90° apart to alternately register with the picture opening, said carrier member and support member having means providing a light trap about said site, a viewing panel covering one of said openings in the carrier member, a film holder seated over the other of the carrier member openings, and latch means on the support member for engaging a part on the carrier member to hold the carrier member with one and the other of said pair of openings in registry with the picture opening.

4. An auxiliary back for studio and like cameras to adapt such cameras to small film, said auxiliary back including a support member for attachment to the back of the camera and having a picture opening substantially centrally thereof, a carrier member having pivotal connection with the support member at a point spaced from one side of the picture opening, said carrier member having a viewing opening and an opening seating the film holder thereover with said openings being each arranged symmetrically of a plane passing radially through the pivotal connection and located substantially 90° apart and all of said openings being equally spaced from the pivotal connection whereby said viewing opening and the opening seating the film holder are alternately registrable with the picture opening on oscillation of the carrier member about said pivotal connection, a shield disposed between the carrier member and the support member and having pivotal connection with the support member offset from the pivotal connection of the carrier member, and means linking the shield to the carrier member to swing said shield across the picture opening at a time when portions of both openings in the carrier member are in connection with the picture opening and to swing the shield out of registry with the picture opening when the viewing opening has moved away from the picture opening of the support member.

5. An auxiliary back for studio and like cameras to adapt such cameras to small film, as described in claim 4, including means for releasably holding the carrier member in its respective positions.

6. An auxiliary back for studio and like cameras as described in claim 4, wherein said linking means includes a slot in the shield extending radially of the pivotal connection for said shield, and a pin on the carrier member extending through the slot.

7. An auxiliary back interchangeable with the viewing back of a studio and like camera to adapt such camera to small film, said auxiliary back including a support member corresponding in size to the viewing back and having a picture opening in the center thereof, said support member having a partially circular site encompassing said picture opening with the center of radius thereof spaced from a side of the said opening, a pivot member carried by the support member in the center of radius, a rectangular carrier member of smaller size than the support member and having one corner secured to said pivot member and having a pair of openings arranged radially from said pivot member substantially 90° apart to alternately register with the picture opening, said carrier member and support member having means providing a light trap about said site, a shield between the carrier member and the support member and having a pivotal connection with the support member offset from said pivot member at a side opposite the picture opening, means linking the shield to the carrier member to swing the shield across the picture opening at the time portions of both openings in the carrier member are moving in connection with the picture opening and to swing the shield out of registry with the picture opening after one of the openings has moved away from the picture opening, a viewing panel covering one of said pair of openings in the carrier member, a film holder seated over the other opening of the carrier member, and latch means on the support member for engaging a part on the carrier member to hold the carrier member with one and the other of said pair of openings in registry with the picture opening.

References Cited by the Examiner

UNITED STATES PATENTS 1,971,435   8/34   Wear _____ 95—36

NORTON ANSHER, *Primary Examiner.*

D. B. LOWE, *Examiner.*